United States Patent
Dolinsek et al.

(10) Patent No.: US 9,719,717 B2
(45) Date of Patent: Aug. 1, 2017

(54) METHOD AND APPARATUS FOR ROUTING UTILITIES IN A REFRIGERATOR

(71) Applicant: Whirlpool Corporation, Benton Harbor, MI (US)

(72) Inventors: Stevan R. Dolinsek, Coralville, IA (US); Timothy A. Fulton, Evansville, IN (US); Daryl L. Harmon, Evansville, IN (US); Chad J. Rotter, Amana, IA (US); David A. Stauffer, Belle Plaine, IA (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 14/188,727

(22) Filed: Feb. 25, 2014

(65) Prior Publication Data

US 2014/0167591 A1     Jun. 19, 2014

Related U.S. Application Data

(62) Division of application No. 12/732,710, filed on Mar. 26, 2010, now Pat. No. 8,690,273.

(51) Int. Cl.
| | |
|---|---|
| *F25D 23/06* | (2006.01) |
| *F25D 23/02* | (2006.01) |
| *H02G 3/22* | (2006.01) |

(52) U.S. Cl.
CPC ......... *F25D 23/028* (2013.01); *F25D 23/065* (2013.01); *H02G 3/22* (2013.01); *F25D 2400/40* (2013.01); *Y10T 16/05* (2015.01)

(58) Field of Classification Search
CPC ....... B60R 16/0222; H02G 3/22; Y10T 16/05; F25D 23/028; F25D 23/065; F25D 2400/40
USPC .................. 312/223.6, 401, 406, 407, 407.1; 174/152 G, 153 G, 151; 16/2.1, 2.2; 248/56; 439/604, 587, 274, 275; 277/606; 62/298; 108/50.02
See application file for complete search history.

(56) References Cited

U.S. PATENT DOCUMENTS

| | | | |
|---|---|---|---|
| 2,563,604 A | * | 8/1951 | Hultgren .................. 174/153 G |
| 2,573,600 A | * | 10/1951 | Pruehs ................. H02G 3/0633 |
| | | | 16/2.5 |
| 2,780,694 A | | 3/1957 | Morton |
| 3,249,687 A | | 5/1966 | Klumpp, Jr |
| 3,787,605 A | | 1/1974 | Van Gessel et al. |
| 3,836,269 A | | 9/1974 | Koscik |

(Continued)

*Primary Examiner* — Daniel J Troy
*Assistant Examiner* — Hiwot Tefera (57) ABSTRACT

Disclosed in this application is a u-shaped grommet for use in a refrigerator. The grommet is fixed so as to allow wires to be routed towards an opening in the liner of the refrigerator, pass through the opening in the liner, and exit the grommet in the opposite direction as the wires entered. The grommet is preferably molded to the wires so that the combined product is inseparable from the wiring which it protects. The grommet is also described as a single piece grommet, although multiple piece grommets are anticipated. Further disclosed in this application is an improved pass-through hinge for routing utilities, including water and electricity, from the door to the body of the refrigerator. The improved hinge features a hollow hinge pin through which utilities may be routed, thereby overcoming the deficiencies of the current state of the art.

10 Claims, 8 Drawing Sheets

(56) References Cited

U.S. PATENT DOCUMENTS

| | | | |
|---|---|---|---|
| 3,848,074 A * | 11/1974 | Channell | 174/38 |
| 4,097,096 A | 6/1978 | Kochendorfer | |
| 4,125,238 A * | 11/1978 | Tanaka | 248/56 |
| 4,180,297 A * | 12/1979 | Abrams | 312/406 |
| 4,186,945 A | 2/1980 | Hahn | |
| 4,493,467 A * | 1/1985 | Borja | 248/56 |
| 4,609,234 A | 9/1986 | Naniwa et al. | |
| 5,000,010 A * | 3/1991 | Powell et al. | 62/277 |
| 5,104,333 A * | 4/1992 | Hatagishi et al. | 439/342 |
| 5,211,462 A | 5/1993 | Bien et al. | |
| 5,234,185 A | 8/1993 | Hoffman et al. | |
| 5,238,299 A * | 8/1993 | McKinney | F25D 23/065 174/153 G |
| 5,252,089 A * | 10/1993 | Hatagishi et al. | 439/310 |
| 5,328,388 A * | 7/1994 | Fust et al. | 439/544 |
| 5,353,472 A | 10/1994 | Benda et al. | |
| 5,510,576 A | 4/1996 | Tenace | |
| 5,666,764 A | 9/1997 | Beatty et al. | |
| 5,792,995 A | 8/1998 | Takeda et al. | |
| 5,870,801 A | 2/1999 | Kim | |
| 5,884,366 A | 3/1999 | Jeong | |
| 5,890,927 A * | 4/1999 | Yashima | H01R 13/5208 439/587 |
| D409,475 S | 5/1999 | Byrne | |
| 5,941,619 A | 8/1999 | Stieben et al. | |
| 5,960,518 A | 10/1999 | Jeong | |
| 5,992,028 A | 11/1999 | Wing | |
| 6,064,003 A | 5/2000 | Moore et al. | |
| 6,070,300 A | 6/2000 | Shin et al. | |
| 6,085,385 A | 7/2000 | Joo | |
| 6,128,807 A | 10/2000 | Lim et al. | |
| 6,297,449 B1 * | 10/2001 | Dagtekin | B60R 16/0222 16/2.1 |
| 6,303,031 B1 | 10/2001 | Senner | |
| 6,354,651 B1 * | 3/2002 | Mori | B60R 16/0222 174/152 G |
| 6,462,275 B1 * | 10/2002 | Daoud | 174/654 |
| 6,536,227 B1 | 3/2003 | Lee | |
| 6,660,937 B1 * | 12/2003 | MacLeod et al. | 174/659 |
| D502,864 S | 3/2005 | Olson | |
| 6,868,692 B2 | 3/2005 | Choi | |
| 7,053,305 B2 * | 5/2006 | Takase et al. | 174/72 A |
| 7,065,832 B2 | 6/2006 | Pohl | |
| 7,097,047 B2 | 8/2006 | Lee et al. | |
| 7,201,609 B2 * | 4/2007 | Ishikawa | 439/587 |
| 7,244,894 B1 * | 7/2007 | Lipp | 174/650 |
| 7,262,372 B2 | 8/2007 | Ickert | |
| 7,266,963 B2 | 9/2007 | Lee | |
| 7,273,986 B2 * | 9/2007 | Fuller et al. | 174/153 G |
| 7,285,014 B2 | 10/2007 | Castaldo et al. | |
| 7,312,407 B2 * | 12/2007 | Case | 174/650 |
| 7,388,156 B2 | 6/2008 | Knagge | |
| 7,465,875 B2 | 12/2008 | Dorner et al. | |
| 7,563,981 B2 * | 7/2009 | Ichikawa et al. | 174/72 A |
| 7,568,357 B2 | 8/2009 | Jenkins, Jr. et al. | |
| 7,641,271 B1 * | 1/2010 | Haydin et al. | 296/208 |
| 7,731,315 B2 | 6/2010 | Lee et al. | |
| 7,886,500 B2 | 2/2011 | Leimkuehler et al. | |
| 7,900,465 B2 | 3/2011 | Wetekamp et al. | |
| 8,022,304 B2 * | 9/2011 | Baydoun | H02G 3/22 16/2.2 |
| 8,037,895 B2 * | 10/2011 | DeCarlo | A61B 18/18 137/15.01 |
| 8,502,071 B2 * | 8/2013 | Caveney et al. | 174/68.3 |
| 8,572,806 B2 * | 11/2013 | Iwahara et al. | 16/2.1 |
| 8,633,389 B2 * | 1/2014 | Badman | 174/77 R |
| 8,648,258 B2 * | 2/2014 | Drouard et al. | 174/152 G |
| 2005/0150678 A1 * | 7/2005 | Takase et al. | 174/72 A |
| 2006/0232177 A1 | 10/2006 | Filho et al. | |
| 2007/0095553 A1 | 5/2007 | Vasarhelyi et al. | |
| 2007/0137892 A1 * | 6/2007 | Knagge | 174/658 |
| 2007/0176527 A1 | 8/2007 | Sabelhaus et al. | |
| 2008/0017397 A1 * | 1/2008 | Komiya | F16G 13/16 174/24 |
| 2009/0203251 A1 * | 8/2009 | Takahashi et al. | 439/376 |
| 2011/0061897 A1 | 3/2011 | Okuhara et al. | |
| 2013/0140060 A1 * | 6/2013 | Baydoun | H02G 3/22 174/152 G |
| 2013/0277107 A1 * | 10/2013 | Hara | B60R 16/0215 174/72 A |
| 2013/0323953 A1 * | 12/2013 | Oshita | 439/271 |
| 2015/0305174 A1 * | 10/2015 | Yoshimura | B60R 16/0222 174/668 |

* cited by examiner

METHOD AND APPARATUS FOR ROUTING UTILITIES IN A REFRIGERATOR

CROSS-REFERENCE TO RELATED APPLICATIONS

The present application represents a divisional application of U.S. patent application Ser. No. 12/732,710 entitled "METHOD AND APPARATUS FOR ROUTING UTILITIES IN A REFRIGERATOR" filed Mar. 26, 2010, currently allowed.

BACKGROUND OF THE INVENTION

Refrigerators are generally constructed of an outer shell, a liner defining a fresh food or freezer compartment, and an insulating layer between the shell and liner. The liner encloses all but one side of the fresh food compartment and a door, drawer, or other movable surface encloses the remaining side. The liner is typically designed to define separate compartments for the freezer and fresh food compartments.

The size of the liner, and therefore the space available is also constrained. The shell of the refrigerator is generally limited in size by industry standards, usually 32-36 inches in width, 23-29 inches in depth, and 60-84 inches in height. Sufficient insulation to keep the refrigerated and freezer compartments at an appropriate temperature also must be installed. This amount will vary by the type of insulation used, desired efficiency, air flow, and other factors. These conditions therefore limit the available space within the liner as well as the available space between the liner and shell.

Older model refrigerators only required power for a compressor to provide cooling to the fresh food and freezer compartments and therefore had fairly simple wiring requirements. Modern refrigerators route electrical wires throughout the interior of the appliance in order to control and power a variety of functions and features. Recent consumer demand for more features requires more complicated power distribution; these features include in-door ice and water dispensing, separately cooled compartments, a variety of lighting arrangements, and air circulating fans.

In order to service these demands, wire harnesses are installed between the outer shell of a refrigerator and the inner liner, passing through the insulation separating the two. One or more wiring harnesses transfers power from the input or source to a controller which distributes wire throughout the refrigerator. Additional wire harnesses from the controller to the various components generally carry one or two types of electrical current: high voltage and/or low voltage.

High voltage current is used for powering components. For example, a compressor requires a certain amount of power to operate. A wiring harnesses providing power to the compressor therefore must be sized to compensate for the amount of power required and be routed so that heating of the electrical components does not cause a fire or otherwise damage the insulation or liner.

In contrast, low voltage current is used for transferring signals between components. For example, when ice is desired from a digital ice dispenser, it is necessary to send a signal to the ice dispenser to dispense ice. The signal may take several forms, a pulse-modulated signal, amplitude or frequency modulation of a sinusoidal wave, impulse signal, or other means of electronic communication. The ice dispensing is typically performed through the use of an auger located within an ice storage bucket. A low voltage signal is sent from the control panel of the ice dispenser to the auger, indicating that the auger should be rotated to deliver ice. It is not necessary for the wire carrying this signal to be sized to the same gage as the high voltage current wires; therefore these wires can be routed more easily in narrow spaces.

Because some wiring harnesses are composed of both high and low voltage wires, the wires are generally bundled together and routed as an individual, considerably larger, strand.

Additionally, in efforts to obtain more interior space in fresh food and/or freezer compartments, components are being reduced in size and positioned in increasingly small areas. For example, in some of Assignee's products, the icemaker has been relocated to a position above the fresh food compartment while storage of ice has been relocated to the door, providing more shelf space within the body of the refrigerated compartment for storage of food or other products.

In relocating the icemaker to a position above the fresh food compartment, the amount of available space has further limited by the direction the wires need to be routed. Power supplies, converters, and controllers are located along the refrigerator door or in the body. Wires must therefore be run along the top of the refrigerator, between the shell and interior liner, before passing through the liner to the icemaker assembly. The wires must then be routed in the ice making compartment to the various components located therein.

The liner of a refrigerator is relatively thin, and therefore openings in the liner tend to have a sharp edge. Therefore, a grommet with a rounded edge and soft or otherwise protected opening is inserted into the opening to protect the wires from damage. In some cases, the grommet is integrally molded to the wires, allowing the grommet to be sized to fit the wires exactly.

In one circumstance, narrow routing requires the wiring harness to be routed in a first direction, pass through the insulation and inner liner, and then be turned 180 degrees to return from the same direction they approached.

Therefore, there has been recognized a need in the art for a grommet which allows for routing wires 180 degrees as they pass through the liner of a refrigerator.

There has been recognized a further need in the art for a method of routing wires 180 degrees within a refrigerator to avoid damage to the wires from sharp edges.

There has been recognized a further need in the art for a refrigerator with narrow openings for routing wires and attendant apparatus for accomplishing this result.

These objections and others readily apparent from the following description are sought to be accomplished by the present invention.

Other routing considerations also present persistent problems in refrigerator appliances. It is the intention of this disclosure to anticipate these problems and present solutions.

One common routing issue is transferring utilities, including electricity and water, between the refrigerator cabinet and the door of the refrigerator. With door-mounted water and ice dispensers, water, electrical signals and power must be transferred to and from the door mounted dispenser. Various products and methods of routing utilities through the door have been proposed, and the present disclosure seeks to improve the existing state of the art by presenting a novel and useful apparatus and method for routing utilities through the hinge between the refrigerator cabinet and door.

The routing of utilities from the door to the refrigerator is of particular concern because of the movement between the two components. The refrigerator door pivots about the hinge and therefore utilities routed through the hinge must be routed so that the door is not constrained from opening, nor are the lines pinched or severed in any way due to continuous and repeated openings of the door. It would therefore be preferable to have the utilities mounted through the hinge, thereby avoiding the need to provide slack in the utilities for the opening or closing of the door.

Therefore, there is recognized a need in the art for an improved method for routing utilities through the hinge between the refrigerator and door.

BRIEF SUMMARY OF THE INVENTION

Described herein is an improved wire routing apparatus. According to one embodiment, a grommet comprises a body integrally molded to a wire, the body for mounting in an appliance and having a first face into which the wire enters and a second face from which the wire exits, thereby causing the wire to be reversed 180 degrees as it passes through the grommet.

According to a second embodiment, a wire routing hinge comprises a mounting portion and a cylindrical extension, the mounting portion being attached to a refrigerator body and the cylindrical extension providing a pivot point about which the door of the refrigerator may rotate. The cylindrical extension is hollow, thereby allowing utility lines to pass through, and further includes a cutout allowing utility lines to exit from the hollow cylindrical extension.

BRIEF DESCRIPTION OF THE DRAWINGS

FIG. 2 shows a side view of the grommet with wires passing through.

FIG. 4 shows a perspective view of the grommet with wires passing through.

DETAILED DESCRIPTION OF THE PREFERRED EMBODIMENTS

The invention will now be described in detail according to the preferred embodiment with reference to the attached figures where numerals relate to their like in the following description.

Figure 1A:
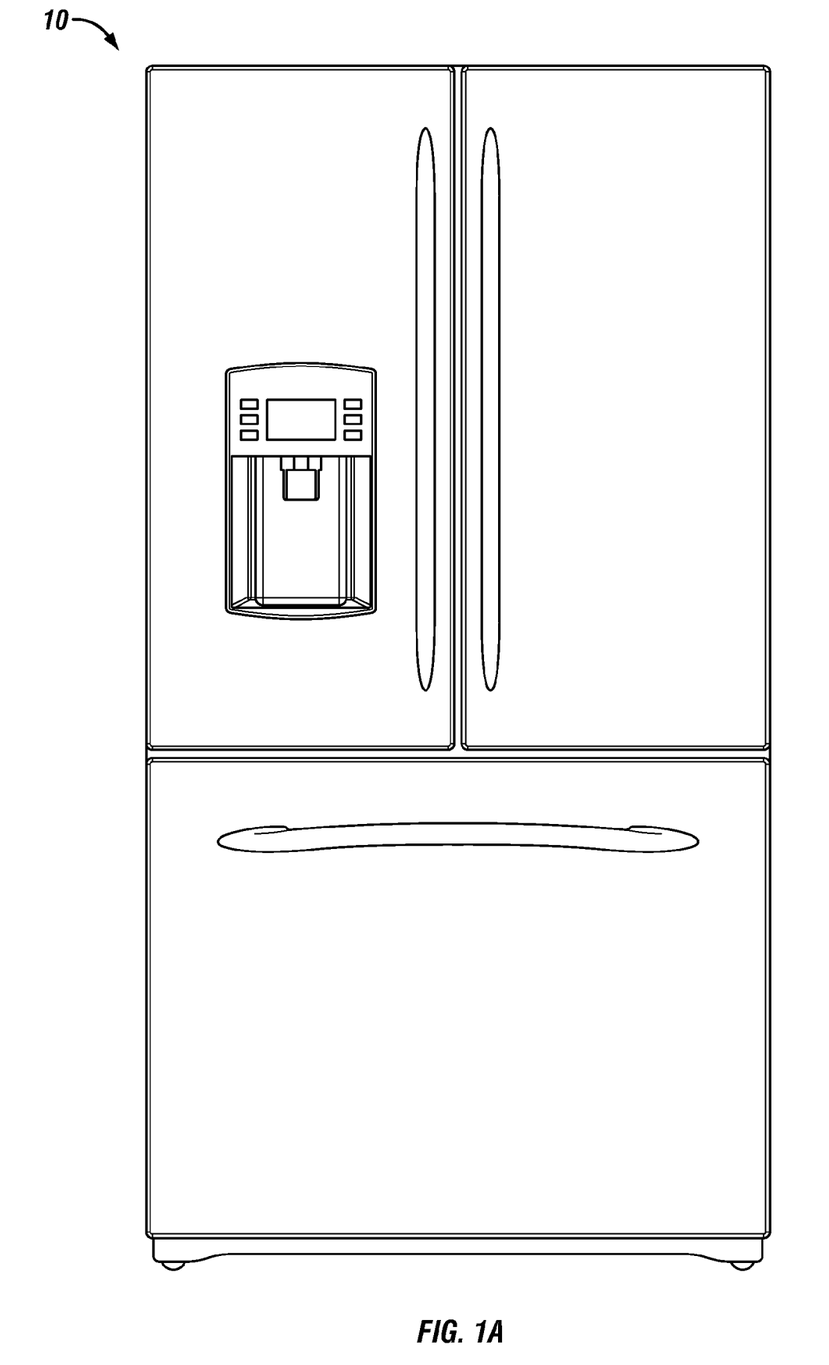
FIG. 1A shows a refrigerator according to one embodiment of the invention.

A refrigerator is generally shown in FIG. 1A. In the preferred embodiment, the grommet is for use in a bottom mount freezer with either a single door or French doors (shown). It is also possible that the grommet may find utility in a side-by-side or top-mounted freezer. It should also be appreciated that the present invention may be used in a variety of refrigerators and in any context. While the grommet is generally shown inside the refrigerator between the liner and insulation, those skilled in the art will recognize that a grommet may be put to a variety of other uses.

Figure 1B:
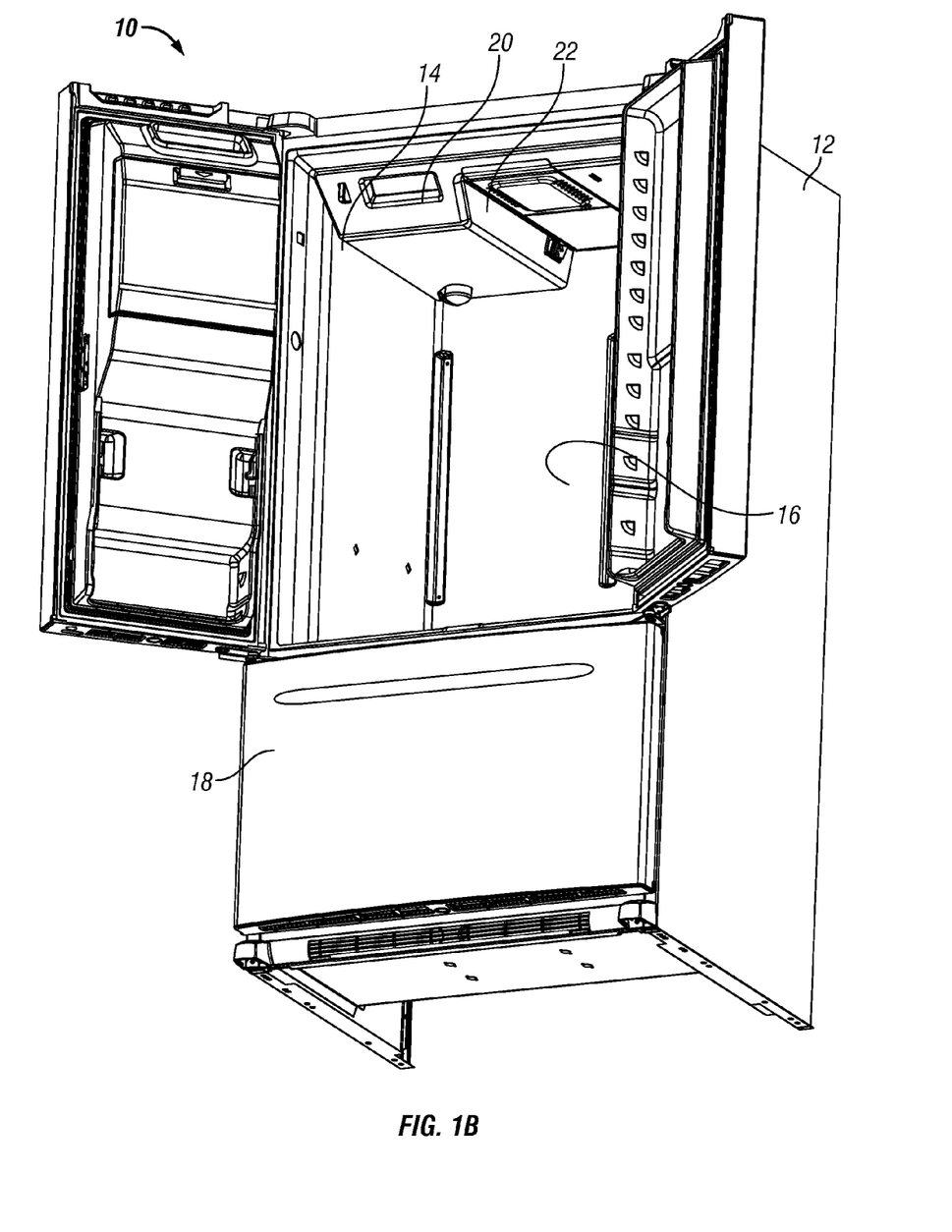
FIG. 1B shows the refrigerator with the doors open demonstrating the location of the ice maker.

FIG. 1B shows the refrigerator with the doors open, demonstrating the arrangement of the interior of the refrigerator. As shown, the refrigerator has a fresh food compartment 16 and a freezer compartment 18. Adjacent to the top of the fresh food compartment 16 and abutting the top of the liner 14 is an ice making compartment 20 which houses an ice mold, impingement fan, light, water storage, and associated valves and solenoids for controlling water flow. The ice making compartment 20 is separated from the fresh food compartment 16 by a cove 22 securing and positioning these various components.

Figure 2:
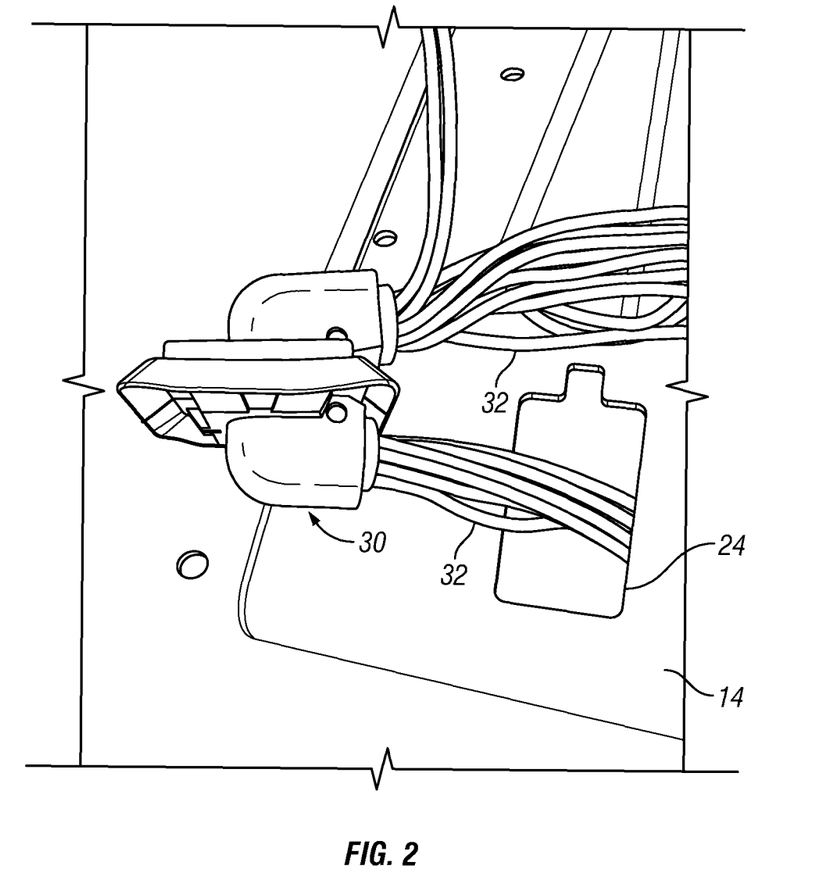
Figure 3:
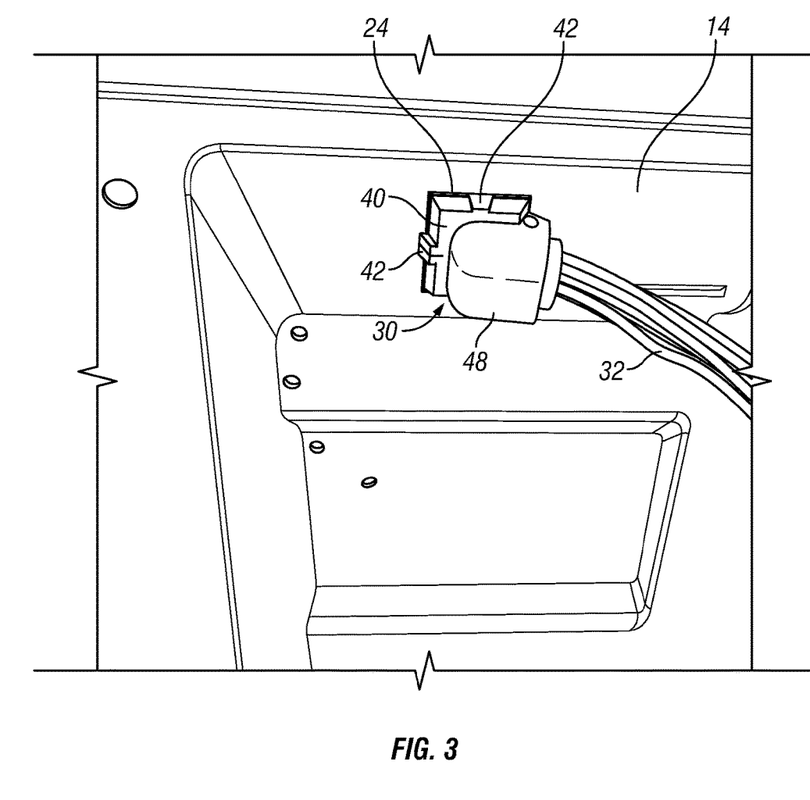
FIG. 3 shows the grommet positioned within the refrigerated cabinet.

FIG. 2 is a perspective view of the grommet showing the wires present. The grommet generally consists of a mounting body with wire guides on opposite sides of the body.

The mounting body of the grommet comprises a top face 36, a bottom face 40, and a deformable seal 38 between the two faces. The grommet may be formed of flexible or rigid materials. According to the preferred embodiment, the bottom face 40 is generally rectangular and has tabs 42 extending from the edges of the rectangle. When the lower face 40 of the grommet is pushed into the opening 24 in the liner 14, these tabs 42 deform or collapse, allowing the grommet to pass through the opening 24. Once through, the tabs 42 reform to their original dimensions and the grommet is secured in place. This allows an installer to easily snap the grommet in place. In this arrangement, it is preferred that the seal 38 is either non-deformable or the top face 36 is larger than the opening 24 in the liner 14.

The grommet is typically installed so that the bottom face 40 is more aesthetically pleasing, and therefore the grommet is installed with the bottom face 40 inside the refrigerator. The only way therefore to remove the grommet would be to remove the refrigerator shell 12. It may also be preferable to install the grommet so that it may be removed from within the refrigerator, for example if there is a need to repair or replace wires passing through the grommet. This may be accomplished by either installing the same grommet described above in an opposing orientation, or the grommet may have an alternative design.

One type of design which may allow the grommet to be installed and removed from within the refrigerator is to design the bottom face 40 to be slightly larger than the opening into which the grommet is inserted. The top face 36 would then be sized so that it is slightly smaller than the opening, allowing the grommet to pass through. The deformable seal 38 about the perimeter of the grommet should be deformed as the grommet is pushed through the opening, but reform once the seal is passed through. This deformable seal 38 will provide resistance to the grommet working its way out of the opening on its own.

The grommet may also be fashioned in multiple parts or rigid materials. For example, the grommet may consist of two ninety-degree components which are joined at the opening in the liner 14. One of the components is installed from one side of the opening and the other component is installed from the other side of the opening. Such an arrangement can be formed entirely of rigid materials as it would not require passing a component larger than the opening through the opening.

Figure 4:
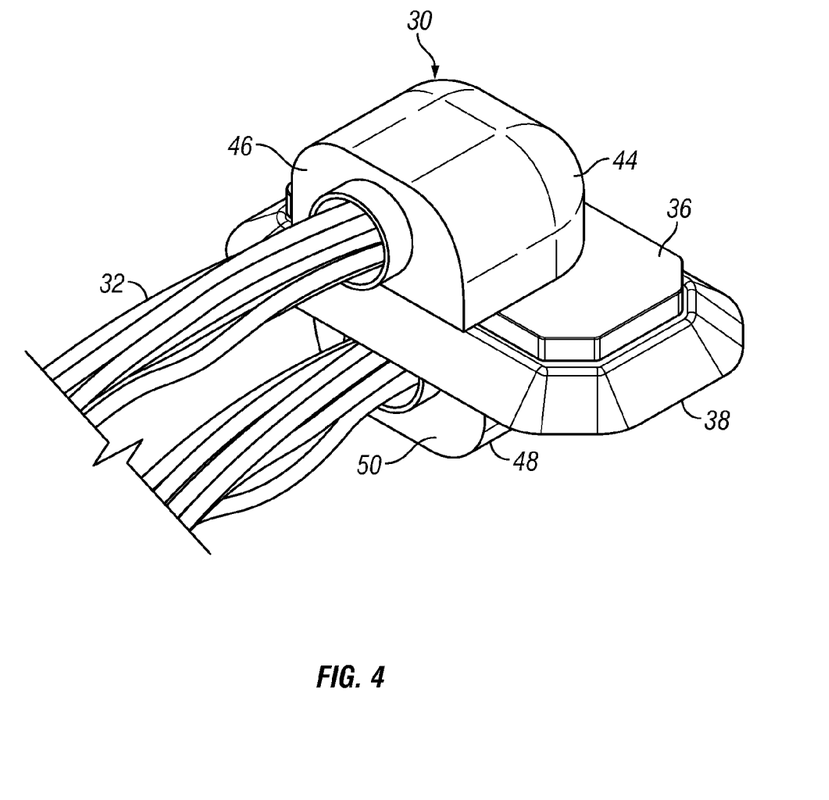

The grommet is further shown in FIG. 4. As shown in this drawing, the top and bottom surfaces of the mounting body each include a wire routing element. Each wire routing element is designed to route wires 90 degrees, for a total of 180 degrees.

According to the preferred embodiment, the 180 degree grommet is formed of deformable material, such as rubber or an elastic plastic material. It is preferred that the wires are first formed in the arrangement as shown. The wires are then placed into a mold which forms the overall shape of the finished grommet. The deformable material is then passed into the mold, encircling the wires and filling the mold completely. Once the deformable material has set, the mold is opened and the finished grommet may be withdrawn. The wires are therefore set into the grommet and cannot be moved or accidentally slip back through the mold, as may be the case with open-channel grommets. The grommet includes faces 46 and 50 that have openings facing in the same direction through which the wires 32 extend. The arrangement of molding the wires directly within the grommet also saves time routing the wires through the grommet and reduces the chance for error.

The grommet may also be formed without the wires being integrally molded to the product. For example, the grommet may be formed with an open channel passing from a surface on the top wire routing element 44, through the mounting body, and exiting through a similarly facing surface in the bottom wire routing element 48. This channel allows a wire to be inserted through the surface of the top wire routing element 44, through the grommet, and exit in an opposing direction from the bottom wire routing element 48. This arrangement further allows variations of wires to be inserted through the grommet without fixing the number or quality of wires passing through.

Figure 5:
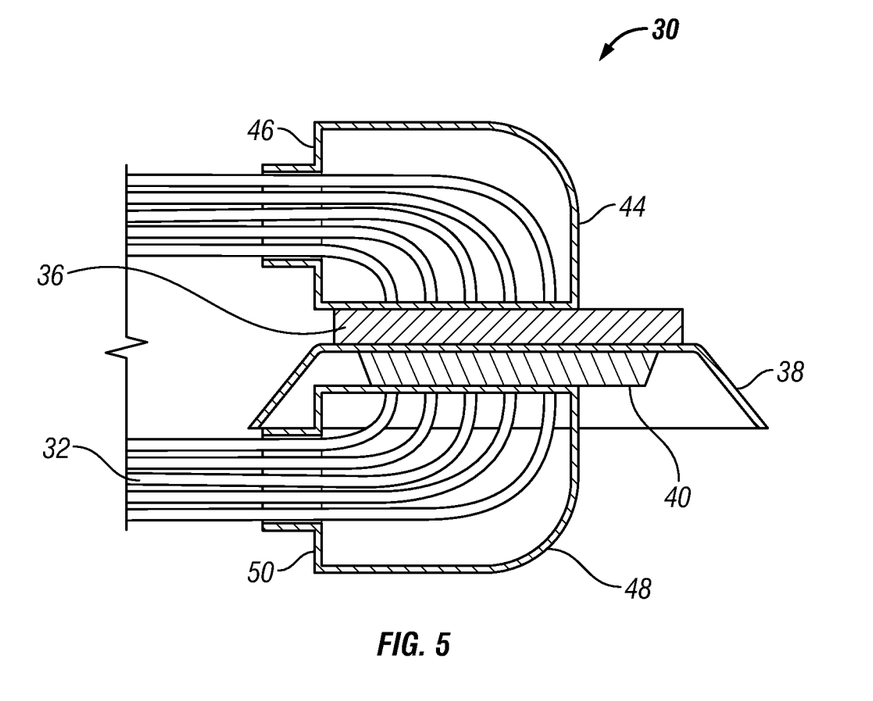
FIG. 5 shows a side cutaway view of the grommet according to one embodiment.

The routing of the wires 32 through the grommet 30 has been generally shown in FIG. 5. This shows how the wires are arranged within the grommet to avoid being tangled or damaged by the sharp turn about the cutout in the liner.

A number of other variations on the invention may be used without departing from the intended scope of the invention. For example, the grommet may be used between fresh food and freezer compartments. Alternatively, the grommet may be used in an environment intended to be watertight, and therefore have a seal designed to be water tight. This may require additional caulking or epoxy about the sealing surface of the grommet. The grommet has also been shown and described as generally rectangular, but it is anticipated that the grommet may be circular, oblong, square, or any other shape. The grommet has also been shown to be used in a refrigerator, however it should be appreciated to those skilled in the art that the grommet may be used outside of the refrigerator context and used more broadly.

Figure 6:
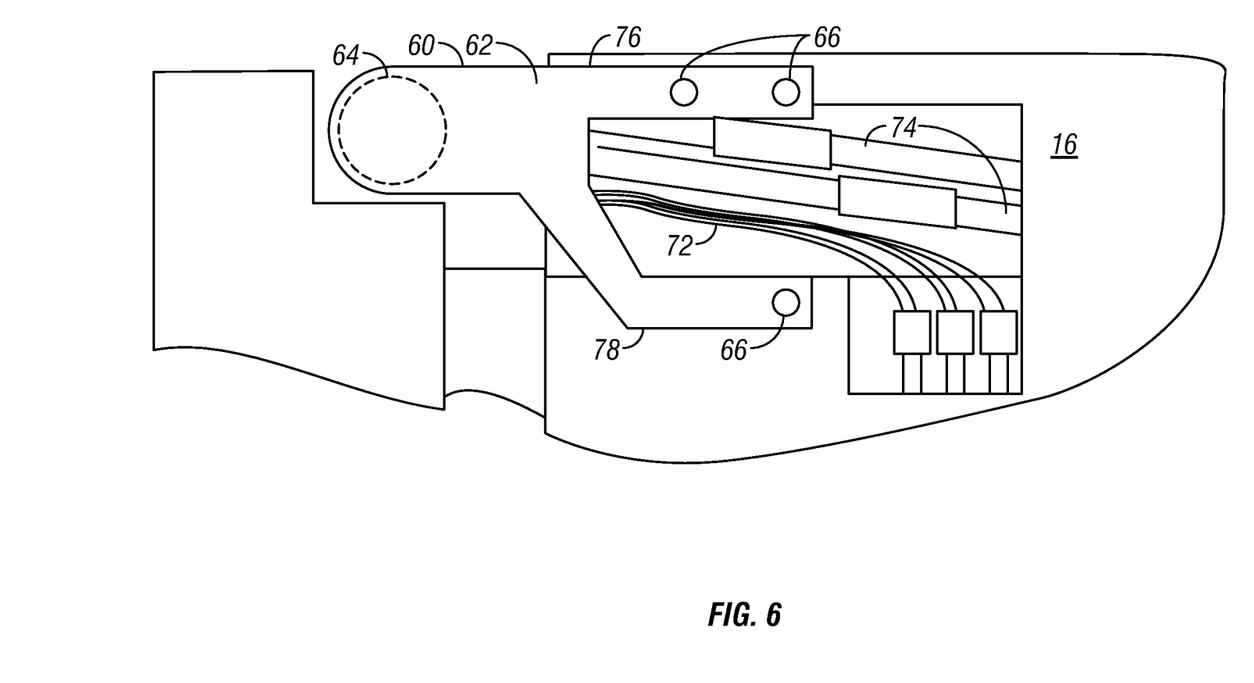
FIG. 6 shows a top view of the hinge of the refrigerator.
Figure 7:
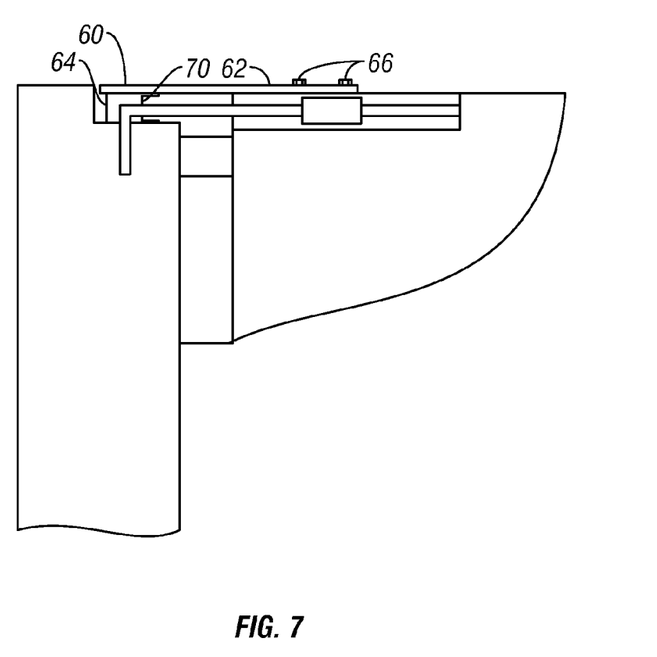
FIG. 7 shows a cutaway side view of the hinge of the refrigerator.
Figure 8:
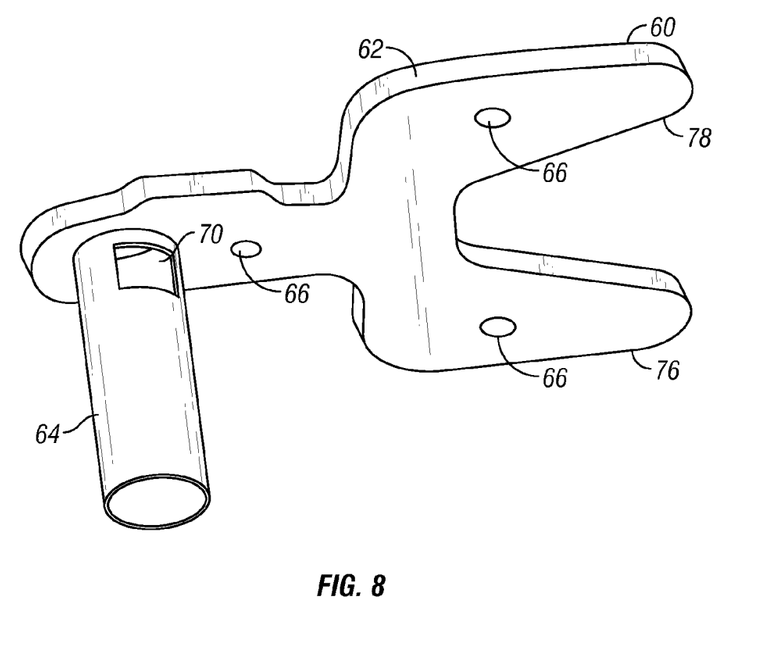
FIG. 8 shows a perspective view of the hinge.

Further described by this invention is an improved utility routing hinge 60 as shown in FIGS. 6-8. This improved utility routing hinge 60 is useful between the fresh food compartment 16 and door, shown in FIG. 6. The hinge 60 generally consists of a mounting bracket 62 and a cylindrical extension 64 which acts as a hinge pin. The mounting bracket 62 has a plurality of mounting holes 66 positioned thereon, the mounting holes 66 for securing the hinge 60 to the refrigerator cabinet 16.

The cylindrical extension 64 is generally hollow, allowing electrical 72 and water 74 conduits to pass through. Near the point where the cylindrical extension 64 and mounting bracket 62 join is a cutout 70 through the wall of the cylindrical extension 64. This cutout 70 allows the electrical 72 and wire conduits 74 to pass out of the hollow interior of the cylindrical extension and pass to the refrigerator, as shown in FIG. 7.

This cylindrical extension 64 has the additional benefit of providing a pivot point about which the refrigerator door can rotate. By passing utilities such as water and electricity through the hinge between the door and refrigerator cabinet, the distance traversed by the utility lines 72, 74 between the door mounted dispenser and the connection point in the refrigerator is a consistent distance as the door is opened. With this benefit, it is not necessary to include extra lengths of wires 72 or water lines 74 to account for the changing distance.

In use, the improved hinge is preferably attached to the refrigerator cabinet 16 by means of the mounting bracket 62 and fasteners through the mounting holes 66. These fasteners may be screws, adhesives, pins, or any other fastening apparatus commonly known to those in the art. The hinge 60 may also be integrally formed to the shell 12, liner 14, or some other component of the refrigerator.

The cylindrical extension 64 is aligned with the door and provides a pivot point about which the door rotates. A complimentary cylinder or other pivot point supports the bottom of the door. Utilities, preferably electrical wires 72 and water conduits 74 are routed from the door, through the center of the cylindrical extension 64, and pass through the cutout 70. These utilities then pass between the first 76 and second 78 legs of the cylindrical extension 64 and are connected to the water and electrical systems of the refrigerator. The first 76 and second 78 legs are preferably spaced apart to provide access to the utilities as shown in FIG. 6. However, it should be appreciated that the mounting plate 62 may be a single piece rather than a pair of legs.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. An appliance having a wall or surface comprising:
   a grommet for directing one or more elongated utility conduits through an opening in the wall or surface of the appliance, the grommet comprising:
   a single piece comprising a mounting body intermediate between conduit guides extending in fixed directions from opposite sides of the mounting body;
   a conduit path through the single piece;
   the mounting body having a perimeter generally in a plane adapted for mounting in the opening in the wall or surface of the appliance and an interior having a length along an axis through the plane adapted to enclose and route the one or more elongated utility conduits through the mounting body along the conduit path;
   each of the conduit guides extending parallel to the plane of the mounting body, and along the opposite sides of the plane of the mounting body in generally the same fixed direction to an end surface and having a perimeter and interior with a length adapted to encircle and route the one or more elongated utility conduits through the conduit guides to and out of said end surface from which the one or more elongated utility conduits can exit from within the grommet substantially perpendicular to the axis through the plane of the mounting body; and
   the mounting body comprising a sealing member generally in the plane of the mounting body;
   so that the grommet can be inserted through the opening in the wall or surface, and enclose, protect, and route in the fixed direction of the conduit guides the one or more elongated utility conduits to and from the opening in the wall or surface in the appliance, and the one or more elongated utility conduits configured to be positioned substantially parallel to opposite sides of the wall or surface in the appliance.

2. The appliance of claim 1 wherein the perimeter includes a groove for receiving an edge of the opening in the wall or surface of the appliance.

3. The appliance of claim 1 wherein the end surface of at least one of the conduit guides is substantially perpendicular to the perimeter of the mounting body.

4. The appliance of claim 1 wherein the one or more elongated utility conduits comprises a wire or a plurality of wires.

5. The appliance of claim 1 wherein the conduit path comprises a continuous open space through the interiors of the mounting body and conduit guides to encircle and route the one or more utility conduits.

6. The appliance of claim 1 wherein the interiors of the mounting body and conduit guides comprise moldable material adapted to be molded over, encircle and route the one or more utility conduits.

7. A wiring assembly in an appliance, comprising:
a single piece grommet having a mounting portion having a perimeter generally in a plane for installing the grommet through a wall of the appliance, first and second routing portions generally parallel to the plane of the mounting portion and in generally the same fixed direction along opposite sides of the plane of the mounting portion, and wire path sections through the first routing portion, the mounting portion, and the second routing portion, wherein the wire path sections through the routing portions are spaced-apart, fixed, and parallel to each other, and substantially perpendicular to the wire path section of the mounting portion;
a wire entering a face of the first routing portion, following the wire path sections, and exiting a face of the second routing portion; and
the mounting portion comprising a sealing member generally in the plane of the mounting portion.

8. The wiring assembly of claim 7 wherein the grommet comprises moldable material molded onto the wire.

9. The wiring assembly of claim 7 wherein the grommet includes a groove for receiving an edge in the appliance wall.

10. The wiring assembly of claim 7 further comprising one or more additional wires following the wire path sections.

* * * * *